US011875650B2

(12) United States Patent
Asher et al.

(10) Patent No.: US 11,875,650 B2
(45) Date of Patent: Jan. 16, 2024

(54) SYSTEM AND METHOD FOR PROVIDING A BLACKJACK GAME HAVING ADDITIONAL OPTIONS FOR A PLAYER

(71) Applicant: CANTOR INDEX, LLC, New York, NY (US)

(72) Inventors: Joseph M. Asher, Las Vegas, NV (US); Lewis C. Findlay, London (GB); Guy Iain Oliver Riches, Leicestershire (GB)

(73) Assignee: CANTOR INDEX, LLC, New York, NY (US)

( * ) Notice: Subject to any disclaimer, the term of this patent is extended or adjusted under 35 U.S.C. 154(b) by 0 days.

(21) Appl. No.: 17/734,192

(22) Filed: May 2, 2022

(65) Prior Publication Data

US 2022/0262208 A1 Aug. 18, 2022

Related U.S. Application Data

(63) Continuation of application No. 16/893,108, filed on Jun. 4, 2020, now Pat. No. 11,322,001, which is a continuation of application No. 16/148,086, filed on Oct. 1, 2018, now Pat. No. 10,679,467, which is a continuation of application No. 13/615,509, filed on Sep. 13, 2012, now Pat. No. 10,089,815, which is a continuation of application No. 13/584,358, filed on Aug. 13, 2012, now Pat. No. 8,465,021, which is a continuation of application No. 12/135,723, filed on Jun. 9, 2008, now Pat. No. 8,240,669, which is a continuation of application No. 11/561,441, filed on Nov. 20, 2006, now Pat. No. 8,474,819, which is a continuation of application No. 10/963,399, filed on Oct. 12, 2004, now Pat. No. 7,144,011.

(51) Int. Cl.
*G07F 17/32* (2006.01)

(52) U.S. Cl.
CPC .......... *G07F 17/3293* (2013.01); *G07F 17/32* (2013.01); *G07F 17/326* (2013.01); *G07F 17/3223* (2013.01)

(58) Field of Classification Search
CPC ............... G07F 17/3293; G07F 17/326; G07F 17/3262; G07F 17/3223
See application file for complete search history.

(56) References Cited

U.S. PATENT DOCUMENTS 5,486,005 A * 1/1996 Neal ......................... A63F 1/18 273/274
6,406,024 B1 * 6/2002 Perkins ............... A63F 3/00157 273/274

(Continued)

*Primary Examiner* — Steve Rowland

(57) ABSTRACT

A method of managing a blackjack game is provided. A blackjack game bet comprising a bet against a house entity on a blackjack hand is received from a player. A pair of cards is determined for a hand for the house entity, and another pair of cards is determined for a hand for the player. The odds of the occurrence of one or more subsequent events are determined based at least in part on one or more of the pair of cards selected for the house entity's hand and one or more of the pair of cards selected for the player's hand. The odds for an additional bet are determined based at least on the determined odds for the one or more subsequent events, and the additional bet is offered to the player at the determined odds for the additional bet.

15 Claims, 2 Drawing Sheets

(56) References Cited

U.S. PATENT DOCUMENTS

| | | | | |
|---|---|---|---|---|
| 6,547,246 B2 * | 4/2003 | Webb | A63F 3/00157 273/274 |
| 6,827,348 B1 * | 12/2004 | Mitchell | A63F 3/00157 273/309 |
| 6,845,981 B1 * | 1/2005 | Ko | A63F 3/00157 463/20 |
| 2002/0074724 A1 * | 6/2002 | Webb | A63F 3/00157 273/274 |
| 2004/0155405 A1 * | 8/2004 | Marks | A63F 3/00157 273/303 |
| 2006/0025191 A1 * | 2/2006 | Snow | G07F 17/32 463/13 |

* cited by examiner

SYSTEM AND METHOD FOR PROVIDING A BLACKJACK GAME HAVING ADDITIONAL OPTIONS FOR A PLAYER

CROSS REFERENCE TO RELATED APPLICATION

This application is a continuation of U.S. patent application Ser. No. 16/893,108 filed Jun. 4, 2020 which is a continuation of U.S. patent application Ser. No. 16/148,086 filed Oct. 1, 2018 (now U.S. Pat. No. 10,679,467 issued Jun. 9, 2020), which is a continuation of U.S. patent application Ser. No. 13/615,509 filed on Sep. 13, 2012 (now U.S. Pat. No. 10,089,815 issued on Oct. 2, 2018), which is a continuation of U.S. patent application Ser. No. 13/584,358, filed on Aug. 13, 2012 (now U.S. Pat. No. 8,465,021 issued on Jun. 18, 2013), which is a continuation of U.S. patent application Ser. No. 12/135,723, filed on Jun. 9, 2008 (now U.S. Pat. No. 8,240,669 issued on Aug. 14, 2012), which is a continuation of U.S. patent application Ser. No. 11/561,441, filed on Nov. 20, 2006 (now U.S. Pat. No. 8,474,819 issued on Jul. 2, 2013), which is a continuation of U.S. patent application Ser. No. 10/963,399 filed on Oct. 12, 2004 (now U.S. Pat. No. 7,144,011 issued on Dec. 5, 2006), each of which is hereby incorporated by reference herein in their entirety.

TECHNICAL FIELD OF THE INVENTION

This invention relates in general to gaming systems and methods and, more particularly, to systems and methods for providing a blackjack game having additional options for a player.

BACKGROUND OF THE INVENTION

A player's objective in blackjack is to beat the dealer (in other words, the house) with cards totaling equal to or less than 21, without going over 21, which is known as "busting." The house has a slight advantage due to the fact that the player must go first and if the player busts, the player automatically loses even if the dealer would have or does subsequently bust.

Before the cards are dealt for each blackjack hand, the player selects the amount he wishes to wager on that hand. The dealer then deals two cards to the player, and two to himself—one face up and one face down. Face cards (kings, queens and jacks) count as 10, aces count as one or 11 (as the player chooses) and all other cards are counted at their face value.

Depending on the pair of cards that are dealt to the dealer and the player, various options are available to the player. If the pair of cards dealt to the player equal 21 (i.e., an ace and a 10 or face card), the player has blackjack and wins the hand unless the dealer also has a blackjack, in which case the hand is a tie, also known as a "push." A winning blackjack pays the player 3 to 2 on his wager. If the pair of cards dealt to the player do not equal 21, the player may hit or stand, or in certain circumstances, the player may take insurance, split a pair, double down, surrender, or take even money.

The player may "hit" if he wants another card, or "stand" if he is satisfied with the total of his hand and does not want another card. The player may typically hit as many times as he wishes before standing, as long as the player's total does not exceed 21. If any hit causes the player's total to exceed 21, the player busts and automatically loses the hand. If the dealer's face-up card is an ace, the player is given an option to make an insurance wager, which is a side bet that the dealer's face-down (hole) card will be a ten-value card (i.e., either a 10 or a face card). The players can make an insurance bet equal to one half of the player's initial bet on the hand. If the dealer's down card is revealed to be a ten-value card, the player wins the insurance bet at 2 to 1 odds. If the dealer's down card is revealed to be any other card, the player loses the insurance bet.

SUMMARY OF THE INVENTION

In one embodiment, a method of managing a blackjack game is provided. A blackjack game bet comprising a bet against a house entity on a blackjack hand is received from a player. A pair of cards is determined for a hand for the house entity, and another pair of cards is determined for a hand for the player. The odds of the occurrence of one or more subsequent events are determined based at least on one or more of the pair of cards selected for the house entity's hand and one or more of the pair of cards selected for the player's hand. The odds for an additional bet are determined based at least on the determined odds for the one or more subsequent events, and the additional bet is offered to the player at the determined odds for the additional bet.

In another embodiment, another method of managing a blackjack game is provided. A blackjack game bet comprising a bet against a house entity on a blackjack hand is received from a player. A pair of cards is determined for a hand for the house entity, and another pair of cards is determined for a hand for the player. The odds that the house entity will bust are determined based at least on one or more of the pair of cards selected for the house entity's hand, and the odds for an additional bet are determined based at least on the determined odds for the one or more subsequent events. The player is then offered the additional bet at the determined odds for the additional bet.

Various embodiments of the present invention may benefit from numerous advantages. It should be noted that one or more embodiments may benefit from some, none, or all of the advantages discussed below.

One advantage is that systems and methods are provided for offering a player calculated odds bets on a blackjack hand in addition to traditional blackjack bets. Various types of calculated odds bets may be offered to the player, such as bets on whether the dealer will bust on the next hit card, whether the dealer will bust at any time during the hand, or whether the player will win the hand for example. In addition, calculated odds bets may be offered to the player at various times during the hand, such as before the hand is dealt, after the initial cards are dealt to the dealer and the player, and after the player and/or dealer has taken one or more hit cards. The calculated odds bets may be offered to the player at odds which give the house entity some statistical advantage. Thus, the house entity may earn additional revenues from calculated odds bets placed by players over time. In addition, providing such calculated odds bets may attract new players and/or increased wagering on blackjack by existing players, which may increase the profits of the house entity.

Another advantage is that relatively sophisticated odds calculations that may not be performed by a human dealer (such a casino dealer, for example) may be performed in real time or substantially in real time using a computer or automated computing device. Such calculated odds may then be communicated to a player in an online gaming environment, thus making various types of calculated odds bets available to the player.

Yet another advantage is that in various embodiments, the calculated odds bets discussed herein may be provided to players according to any suitable medium, such as, for example, in a land-based casino or other betting location, online (such as via the Internet, for example), or via mobile betting terminals.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1:
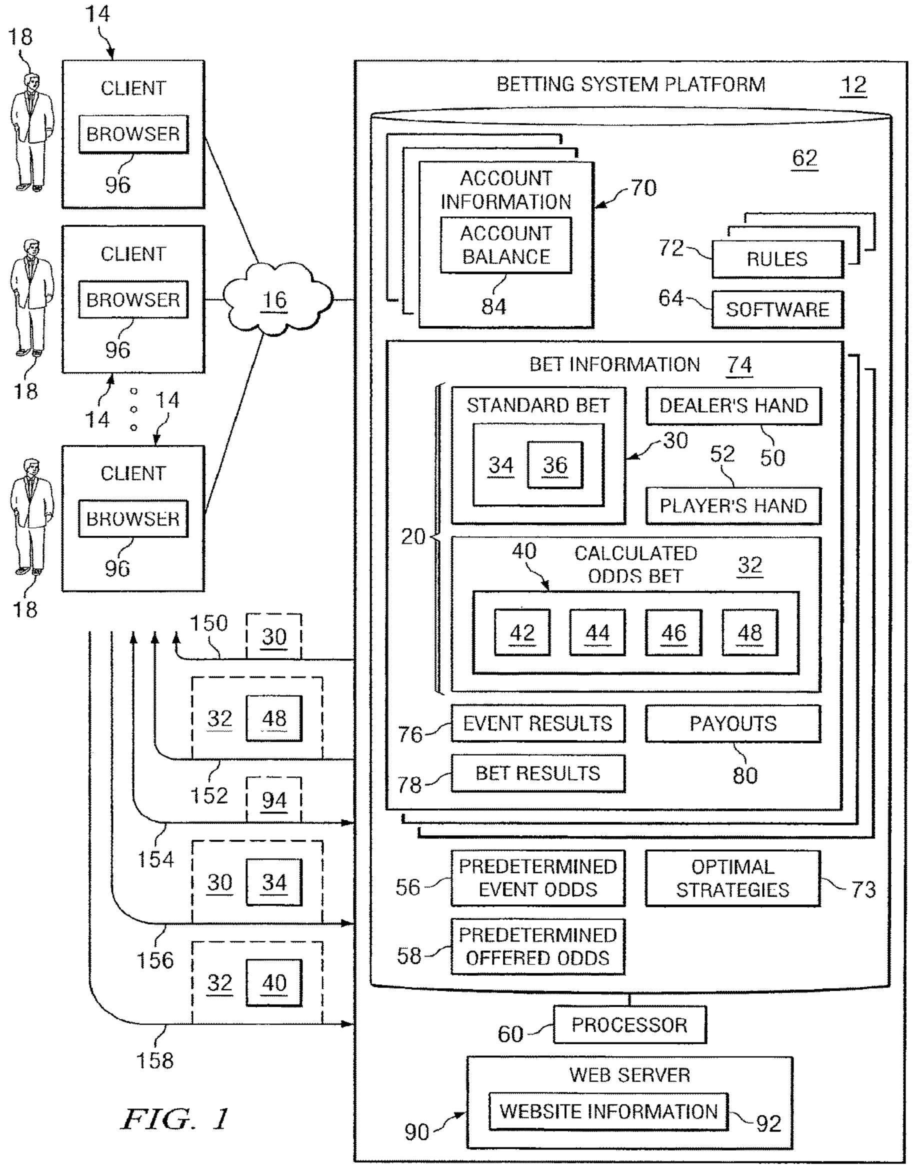
FIG. 1 illustrates an example system for providing a blackjack game in which players are offered calculated odds bets in addition to traditional bets in accordance with an embodiment of the present invention.

FIG. 1 illustrates an example system 10 for providing a blackjack game in which players are offered calculated odds bets in addition to traditional bets in accordance with an embodiment of the present invention. In general, system 10 allows a player to place traditional blackjack bets against the house, as well as one or more types of calculated odds bets, which are additional, or "side," bets available to the player. In certain embodiments, after the player's and the dealer's original hands are dealt (i.e., after two cards have been dealt to each of the player and the dealer), the odds of some subsequent event occurring—such as, for example, the odds of the dealer busting on the dealer's first hit card, or the odds of the player winning the hand—are determined. The player is then offered a calculated odds bet (in addition to the player's original wager on the hand) on whether the subsequent event will occur. The player is offered this calculated odds bet at some odds that differ from the determined odds of the event occurring such that the house has some statistical advantage. In some embodiments, the player is allowed to select the amount he wishes to wager on the calculated odds bet, while in other embodiments, the amount of the wager on the calculated odds bet is determined for the player, such as to provide the player an opportunity to break even on a losing hand, for example. If the player makes such a calculated odds bet, the results of the bet are determined based on whether or not the subsequent event occurs, and a payment between the player and the house is determined according to the odds at which the bet was offered to the player. By using a computer or other automated computing devices, betting system platform 12 may perform the relatively sophisticated odds calculations underlying various calculated odds bets in real time or substantially in real time such that the odds may be calculated to the player. Such calculations may not similarly be performed by a human dealer (such a casino dealer, for example) in real time. Thus, betting system platform 12 may offer a variety of calculated odds bets that could not previously be offered by a casino.

System 10 includes a betting system platform 12 and a plurality of clients 14 coupled to betting system platform 12 via a communication network 16 to provide players 18 access to betting system platform 12. Betting system platform 12 may be generally operable to manage bets 20 received from players 18 via clients 14. In some embodiments, betting system platform 12 functions as an Internet betting provider that provides Internet account wagering by providing online betting accounts to players 18. Using an online betting account, a player 18 may use a client 14 to interface with one or more websites associated with betting system platform 12 in order to fund the account, view betting information regarding betting events, and place bets 20. Such online betting accounts may include one or more various types of accounts, such as deposit accounts, credit accounts, stop-loss accounts, and hybrid accounts, for example.

Communication network 16 couples and facilitates wireless or wireline communication between clients 14 and betting system platform 12. Communication network 16 may include one or more servers, routers, switches, repeaters, backbones, links and/or any other appropriate type of communication devices coupled by links such as wireline, optical, wireless, or other appropriate links. In general, communication network 16 may include any interconnection found on any communication network, such as a local area network (LAN), metropolitan area network (MAN), wide area network (WAN), the Internet, portions of the Internet, or any other data exchange system.

As discussed above, betting system platform 12 may be generally operable to manage bets 20 received from players 18 via clients 14 and communication network 16. Bets 20 include blackjack hand bets 30 and calculated odds bets 32. Blackjack hand bets 30 may include an original wager on a hand, a double down wager, an insurance bet, or a split bet, for example. Calculated odds bets 32 may include bets that are offered to players 18 at odds that are determined based on one or more cards in the dealer's hand and/or one or more cards in the player's hand. For example, calculated odds bets 32 may include (1) bets on whether the dealer will bust on the dealer's first hit card, (2) bets on whether the dealer will bust on the dealer's next hit card, (3) bets on whether the dealer will bust at any point in the hand, (4) bets on whether the player will win the hand, (5) bets on whether the player's next hit card will be better than the dealer's next hit card, without busting, (6) bets on whether the player will obtain a particular total (e.g., 21) and/or (7) bets on whether the dealer will obtain a particular total (e.g., 20). These examples are provided without limitation, and it is understood that additional calculated odds bets 32 may be offered to players 18.

Each blackjack hand bet 30 is defined by one or more blackjack hand bet parameters 34, such as the identity of the player 18 who placed the bet 20 and a unit stake 36 of the bet 30, for example. The unit stake 36 of a blackjack hand bet 30 represents the amount that the player 18 placing the bet wishes to wager on a particular hand of blackjack. The unit stake 36 may be defined as a monetary value, such as in dollars or pounds for example, as a number of betting credits, or in any other suitable manner.

Each calculated odds bet 32 is defined by one or more calculated odds bet parameters 40, such as the identity of the player 18 who placed the calculated odds bet 32, an identification of the blackjack hand bet 30 with which the calculated odds bet 32 corresponds, a unit stake 42 of the bet 32, the bet type 44, event odds 46, and offered odds 48, for example. The unit stake 42 of a calculated odds bet 32 represents the amount that the player 18 placing the bet wishes to wager on the calculated odds bet 32. The unit stake

42 may be defined as a monetary value, such as in dollars or pounds for example, as a number of betting credits, or in any other suitable manner.

For some calculated odds bets 32, the unit stake 42 may be selected by the player 18 placing the bet 32. In some embodiments, the player 18 may select a unit stake 42 for a bet 32 within a particular range determined by betting system platform 12. For example, the range of allowable unit stakes 42 that a player 18 may wager on a particular type of calculated odds bet 32 may be predetermined by betting system platform 12. As another example, the range of allowable unit stakes 42 that a player 18 may wager on a particular calculated odds bet 32 may be determined by betting system platform 12 based on one or more factors, such as the unit stake 36 wagered by the player 18 on the associated blackjack game bet 30. For instance, for a particular blackjack hand, betting system platform 12 may allow a player 18 to place a calculated odds bet 32 having a unit stake 42 that is less than or equal to 50% of the unit stake 36 wagered by the player 18 on the blackjack game bet 30 for that hand.

The bet type 44 of each calculated odds bet 32 identifies the type of the bet. As discussed above, example bet types 44 includes (1) bets on whether the dealer will bust on the dealer's first hit card, (2) bets on whether the dealer will bust on the dealer's next hit card, (3) bets on whether the dealer will bust at any point in the hand, (4) bets on whether the player will win the hand, (5) bets on whether the player's next hit card will be better than the dealer's next hit card, without busting, (6) bets on whether the player will obtain a particular total (e.g., 19) and/or (7) bets on whether the dealer will obtain a particular total (e.g., 21).

Event odds 46 for a calculated odds bet 32 may comprise odds that one or more events underlying the calculated odds bet 32 will occur. Event odds 46 may be determined based on one or more cards in the dealer's hand and/or one or more cards in the player's hand. For certain bet types 44, event odds 46 may be determined based on one or more cards in the dealer's hand. For other bet types 44, event odds 46 may be determined based on one or more cards in the dealer's hand and one or more cards in the player's hand. Offered odds 48 for a calculated odds bet 32 may comprise the odds at which a calculated odds bet 32 is offered to a player 18. Offered odds 48 for a calculated odds bet 32 may be determined based on the event odds 46 determined for one or more events underlying that calculated odds bet 32, such as to give the house some mathematical or statistical advantage. The offered odds 48 may be offset from the determined event odds 46 by a predetermined amount, such as a predetermined percentage of the event odds 46 or a predetermined percentage of the unit stake 42 of the calculated odds bet 32, for example. For example, offered odds 48 may be determined to be offset from the corresponding event odds 46 by 10% of the event odds 46. Thus, for a calculated odds bet 32 in which the event odds 46 are determined to be 3:1 (equivalent to a 25% chance of the event(s) underlying the bet 32 occurring), the offered odds 48 would be 29:11 (equivalent to a 27.5% chance of the even(s) occurring). As another example, offered odds 48 may be determined to be offset from the corresponding event odds 46 by 10% of the unit stake 42 of the calculated odds bet 32. Thus, for a calculated odds bet 32 in which the event odds 46 are determined to be 3:1 (equivalent to a 25% chance of the event(s) underlying the bet 32 occurring), the offered odds 48 would be 13:7 (equivalent to a 35% chance of the event(s) occurring).

To better illustrate the relationship between event odds 46 and offered odds 48, suppose betting system platform 12 offers a calculated odds bet 32 on whether the dealer will bust on the dealer's first hit card. The event odds 46 for this calculated odds bet 32 define the odds that the dealer will bust on the dealer's next hit card based on the dealer's face-up card. Suppose that for a particular face-up card in the dealer's hand, the odds that the dealer will bust on the next hit card are determined to be 4.0:1 (equivalent to a 20.0% chance of the event(s) underlying the bet 32 occurring). Assuming that the offered odds 48 are offset from the event odds 46 by 10% of the event odds 46, the offered odds 48 are determined to be approximately 3.55:1 (equivalent to a 22.0% chance of the event(s) occurring). Thus, for the particular face-up card in the dealer's hand, betting system platform 12 may offer a player the calculated odds bet 32 at 3.55:1 odds. If the player 18 places the calculated odds bet 32 for a particular unit stake 42 and the dealer does not bust on the first hit card, the player 18 loses the calculated odds bet 32, and thus loses his unit stake 42. However, if the player 18 places the calculated odds bet 32 for the particular unit stake 42 and the dealer does bust on the first hit card, the player 18 wins the calculated odds bet 32 at the offered odds of 3.55:1. In other words, the player 18 wins 3.55 times the unit stake 42 of his wager on the calculated odds bet 32.

In some embodiments, betting system platform 12 stores a set of predetermined event odds 56, which are used in determining event odds 46 for the occurrence of particular events in particular situations. The set of predetermined event odds 56 may include predetermined event odds 56 for the occurrence of various types of events in various situations, such as for each possible combination of dealer's hand 50 and player's hand 52, for example. Thus, in some embodiments or situations, to determine event odds 46 for the occurrence of particular events in particular situations, betting system platform 12 identifies the situation (e.g., the cards in dealer's hand 50 and/or player's hand 52 upon which the event odds 46 are determined) and obtains from the set of predetermined event odds 56 the odds corresponding to that situation. For example, the set of predetermined event odds 56 may include the odds of a player 18 winning a hand for each combination of dealer face-up card and player's hand 52. For a particular blackjack hand, after the original pair of cards is dealt to the dealer's hand 50 and the player's hand 52, betting system platform 12 may identify the dealer's face-up card and the pair of cards in the player's hand 52. Betting system platform 12 may then use the set of predetermined event odds 56 to identify the event odds 46 for player 18 winning the hand that correspond to the identified situation.

In other embodiments or situations, betting system platform 12 determines event odds 46 for particular events by calculating such odds in real time or substantially in real time. Thus, in some embodiments or situations, to determine event odds 46 for the occurrence of particular events in particular situations, betting system platform 12 identifies the situation (e.g., the cards in dealer's hand 50 and/or player's hand 52 upon which the event odds 46 are determined) and calculates the event odds 46 for that identified situation in real time or substantially in real time.

In addition, in some embodiments, betting system platform 12 stores a set of predetermined offered odds 58, which are used in determining offered odds 48 for particular calculated odds bets 32. The set of predetermined offered odds 58 may include predetermined offered odds 58 for various event odds 46. For example, the set of predetermined offered odds 58 may define offered odds 48 corresponding to various event odds 46 such that the offered odds 48 provide the house entity some predetermined statistical advantage, such as a 10% advantage, for example. Thus, in some embodiments or situations, betting system platform 12 determines the event odds 46 underlying a particular calculated odds bet 32 (either predetermined event odds 56 or by calculating the event odds 46), then determines the offered odds 48 corresponding to the determined calculated odds bet 32 using predetermined offered odds.

In other embodiments or situations, betting system platform 12 determines offered odds 48 for particular calculated odds bets 32 by calculating such odds in real time or substantially in real time. Thus, in some embodiments or situations, to determine offered odds 48 for a particular calculated odds bet 32, betting system platform 12 determines the event odds 46 and then calculates the offered odds 48 in real time or substantially in real time based at least on such determined event odds 46.

Betting system platform 12 may include a processor 60 coupled to a memory 62 and is generally operable to manage bets 20 (including both blackjack hand bets 30 and calculated odds bets 32) received from players 18 via clients 14. Processor 60 is generally operable to execute various algorithms or calculations to provide various functions related to managing bets 20, such as for example, offering players 18 blackjack hand bets 30, determining (i.e., dealing) cards for the dealer (or house) and players 18, calculating event odds 46 and offered odds 48 for calculated odds bets 32, offering players 18 calculated odds bets 32, managing dealer's hands 50 (including selecting cards for the dealer), managing player's hands 52 (including selecting cards for players 18), determining whether various events related to calculated odds bets 32 have occurred, determining the result of blackjack hand bets 30, determining the result of calculated odds bets 32, and determining payments between the house and players 18 for both blackjack hand bets 30 and calculated odds bets 32 based on the determined results of such bets. Processor 60 may comprise any suitable processor that executes a betting system software application 64 or other computer instructions, such as a central processing unit (CPU) or other microprocessor and may include any suitable number of processors working together.

Memory 62 may comprise one or more memory devices suitable to facilitate execution of the computer instructions, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), or any other suitable volatile or non-volatile memory device.

Memory 62 is generally operable to store various information that may be used by processor 60 in performing any functions related to managing bets 20, such as any of the various functions discussed above. For example, memory 62 may comprise any suitable number of databases, which may be co-located or physically and/or geographically distributed. In the example shown in FIG. 1, memory 62 may store any or all of the following: account information 70 for players 18; a set of rules 72 for each type 44 of calculated odds bets 32 offered by betting system platform 12; optimal player strategies 73; bet information 74 for bets 20 (including both blackjack hand bets 30 and calculated odds bets 32) received from players 18; event results 76; bet results 78; and payouts 80.

Account information 70 may include various information regarding one or more accounts maintained for each player 18 of system 10, such as, for example, personal information regarding the player 18, an account ID, a player password, the type of each account maintained for the player 18, and an account balance 84 for each account. In certain embodiments, account information 70 for each player 18 may be managed by betting system platform 12. For example, betting system platform 12 may manage the account balance 84 for each account associated with a player 18, which may include, for example, adding funds received from players 18, increasing and decreasing balances based on the results of bets 20 placed by players 18, and allowing players 18 to withdraw funds from their accounts.

The set of rules 72 for each type 44 of calculated odds bets 32 offered by betting system platform 12 defines various aspects of that type 44 of calculated odds bet 32, such as at what point during the blackjack hand to offer the calculated odds bet 32 to the player 18, how to determine the event odds 46 and offered odds 48 for that type 44 of calculated odds bet 32, and how to determine payouts 80 for that type 44 of calculated odds bet 32, for example. Example rules 72 for various types 44 of calculated odds bets 32 that may be offered by betting system platform 12 are discussed in greater detail below.

Optimal player strategies 73 may define statistically optimal strategies or decisions for a player for various situations in a blackjack hand. Playing according to such optimal player strategies 73 may be commonly referred to as playing "by the book." Betting system platform 12 may store a set of optimal player strategies 73 covering any possible situation in a blackjack hand, or a set of optimal player strategies 73 for each type 44 of calculated odds bet 32 offered by betting system platform 12. Optimal player strategies 73 may define playing strategies or decisions that will optimize the player's odds of winning the hand or maximizing his winnings on the hand. Alternatively or in addition, betting system platform 12 may store optimal player strategies 73 defining playing strategies or decisions that will optimize the player's odds of winning a particular type 44 of calculated odds bet 32, such as a calculated odds bet 32 on whether the dealer will bust at any time during the hand. Betting system platform 12 may use optimal player strategies 73 in calculating the event odds 46 underlying various calculated odds bets 32. For example, in calculating the event odds 46 underlying a particular calculated odds bet 32, betting system platform 12 may identify the situation in the hand (i.e., the current status of the dealer's hand 50 and/or the player's hand 52), determine the optimal player strategy 73 corresponding to the identified situation, and determine the event odds 46 according to the determined optimal player strategy 73. In other words, betting system platform 12 assumes or predicts that in playing his hand, the player 18 will make the decisions defined by the optimal player strategy 73 for the relevant situation.

Bet information 74 regarding received bets 20 may include various information regarding blackjack hand bets 30 and calculated odds bets 32. For each blackjack hand, bet information 74 may include information regarding a blackjack hand bet 30 placed by a player 18, as well as information regarding each calculated odds bet 32 offered to and/or placed by the player 18 in connection with the blackjack hand bet 30. First, bet information 74 may include various information received from the player 18, such as blackjack hand bet parameters 34 for a blackjack hand bet 30 (such as the identity of the player 18 who placed the bet 20 and the unit stake 36 of the bet 30, for example) and calculated odds bet parameters 40 for calculated odds bet 32 (such as the identity of the player 18 who placed the calculated odds bet 32, the blackjack hand bet 30 with which the calculated odds bet 32 corresponds, a unit stake 42 of the bet 32, the bet type 44, event odds 46, and offered odds 48, for example). In addition, bet information 74 may include various information determined by betting system platform 12, such as the dealer's hand 50 and the player's hand 52 for the blackjack hand, event results 76 associated with each calculated odds bet 32 placed by the player 18, bet results 78 associated with the blackjack hand bet 30 and each calculated odds bet 32 placed by the player 18, and payouts 80.

In certain embodiments, betting system platform 12 may be associated with or comprise one or more web servers 90 operable to store websites and/or website information 92 in order to host one or more web pages 94. Web servers 90 may be coupled to communication network 16 and may be partially or completely integrated with, or distinct from, betting system platform 12. Each client 14 may include a browser application 96 operable to provide an interface to web pages 94 hosted by web servers 90 such that players 18 may communicate information to, and receive information from, betting system platform 12 via communication network 16. For example, one or more web pages 94 may allow a player 18 to place blackjack hand bets 30 and calculated odds bets 32 with betting system platform 12, including selecting various blackjack hand bet parameters 34 for blackjack hand bets 30 and various calculated odds bet parameters 40 for calculated odds bets 32.

One or more web pages 94 may be operable to communicate various information to the player 18, such as, for example, various account information 70 (such as the player's current account balance 84), information regarding available bets 20 that may be placed by player 18 (such as the types 44 of calculated odds bets 32 available to the player 18 and the offered odds 48 for such calculated odds bets 32, for example), and information regarding the status of bets 20 placed by the player 18 (such as the current dealer's hand 50 and player's hand 52, for example).

Although particular embodiments of system 10 in which calculated odds bets 32 are provided to players 18 via online communications (such as via the Internet, for example) are discussed herein, it should be understood that calculated odds bets 32 may be provided to players according to any other suitable medium. For example, one or more calculated odds bets 32 may be offered to players 18 in a land-based casino or other land-based betting location. In such situations, any suitable computer systems and/or other electronic devices may be provided in the casino or other land-based betting location in order to perform various calculations that may be too sophisticated for a human dealer. As another example, calculated odds bets 32 may be offered to players 18 via mobile betting terminals, such as video-poker terminals or similar machines, for example.

General Operation of System 10

As discussed above, in operation, betting system platform 12 may be generally operable to manage bets 20 received from players 18 via clients 14, including both blackjack hand bets 30 and calculated odds bets 32. In certain embodiments, a player 18 may use browser application 96 to log into betting system platform 12. For example, player 18 may use browser application 96 to access various web pages 94 associated with betting system platform 12. Player 18 may place a blackjack hand bet 30 with betting system platform 12, which may act as the dealer or house. Player 18 may select one or more blackjack hand bet parameters 34 for the blackjack hand bet 30, including the unit stake 36 of the bet 30. Betting system platform 12 may then select (or "deal") a pair of cards for the dealer's hand 50 and a pair of cards for the player's hand 52. In certain embodiments, betting system platform 12 deals one face-up card and one face-down card (i.e., the hole card) for the dealer's hand 50, such that player 18 can see the value of the dealer's face-up card, but not the dealer's face-down card.

Player 18 may then make various playing decisions in playing the blackjack hand, such as whether to hit, stand, double, split a pair, take insurance, or take even money, for example. Player 18 may communicate these decisions to betting system platform 12 via client 14 and betting system platform 12 may act accordingly. At certain points during the blackjack hand, betting system platform 12 may offer player one or more types 44 of calculated odds bets 32.

Before offering such calculated odds bets 32, betting system platform 12 may determine (1) the event odds 46 for particular events underlying each calculated odds bet 32, and (2) the offered odds 48 to offer player 18 for each calculated odds bet 32. As discussed above, betting system platform 12 may determine the event odds 46 for particular events underlying each calculated odds bet 32 based on one or more of the cards in the dealer's hand 50 and/or one or more of the cards in the player's hand 52. For some types 44 of calculated odds bets 32, betting system platform 12 may determine the current situation (such as the current dealer's hand 50 and the current player's hand 52, for example) and identify the optimal player strategies 73 corresponding to such situation. Betting system platform 12 may use these identified optimal player strategies 73 in calculating the event odds 46. For example, for a calculated odds bet 32 on whether player 18 will win the hand, betting system platform 12 may determine the event odds 46 that player 18 will win the hand based on (1) the cards currently in the dealer's hand 50 except the dealer's face-down card, (2) the cards currently in the player's hand 52, and (3) the optimal player strategy 73 corresponding to the current situation in the hand.

Betting system platform 12 may then determine the offered odds 48 for each calculated odds bet 32 based on the event odds 46 determined for that calculated odds bet 32 such that the house will have some statistical advantage, such as a 10% statistical advantage, for example. In certain embodiments, betting system platform 12 may offer player 18 multiple types 44 of calculated odds bet 32 during the same blackjack hand, and in some cases, at the same point during the blackjack hand.

Player 18 may place any of the calculated odds bet 32 offered to player 18 by betting system platform 12. When placing a calculated odds bet 32, player 18 may select one or more calculated odds bet parameters 40 for that calculated odds bet 32, such as the unit stake 42 for that calculated odds bet 32. In certain embodiments, player 18 may place more than one type 44 of calculated odds bet 32 during the same blackjack hand, and in some cases, at the same point during the blackjack hand. After receiving a calculated odds bet 32 placed by player 18, betting system platform 12 may continue managing the blackjack hand, such as by dealing additional cards or offering player 18 additional hit cards, for example.

At some point, betting system platform 12 determines event results 76 underlying each calculated odds bet 32 placed by player 18 based on one or more cards currently in the dealer's hand 50 and/or one or more cards currently in the player's hand 52. For example, for the calculated odds bet 32 on whether player 18 will win the hand, event results 76 may comprise the determination at the conclusion of the hand of whether player 18 won, lost or pushed the hand. Betting system platform 12 may then determine bet results 78 for each calculated odds bet 32 placed by player 18 based on the determined event results 76 underlying each calculated odds bet 32. For example, if player 18 placed a calculated odds bet 32 that he would win the hand and betting system platform 12 determines that player 18 lost the hand, betting system platform 12 may determine that the bet result 78 of the calculated odds bet 32 is a loss.

Betting system platform 12 may then determine payouts 80 for each calculated odds bet 32 based on the bet results 78 for that calculated odds bet 32. The payout 80 for each calculated odds bet 32 may be based on the unit stake 42 and the offered odds 48 for that calculated odds bet 32. Payouts 80 may be determined during or at the conclusion of the blackjack hand, depending on the type 44 of the calculated odds bet 32. For example, for a calculated odds bet 32 on whether player 18 will win the hand, payout 80 is not determined until the conclusion of the blackjack hand. However, for a calculated odds bet 32 on whether the dealer will bust on the dealer's next hit card, payout 80 may be determined at any point after that hit card is selected (or "dealt"), which may be prior to the conclusion of the blackjack hand. In addition, at the conclusion of the blackjack hand, betting system platform 12 may also determine a payout 80 for the blackjack hand bet 30 based on whether player 18 won, lost or pushed the hand. Betting system platform 12 may then update the player's account balance 84 based on payouts 80 determined for both the blackjack hand bet 30 and any calculated odds bet 32 placed by player 18 on that hand.

In this manner, betting system platform 12 may use a computer or other automated computing devices to perform relatively sophisticated odds calculations underlying various calculated odds bets 32 in real time or substantially in real time. As a result, betting system platform 12 may offer a variety of calculated odds bets 32 that could not previously be offered by a casino.

Types of Calculated Odds Bets

As discussed above, example types 44 of calculated odds bets 32 may include (1) bets on whether the dealer will bust on the dealer's first hit card, (2) bets on whether the dealer will bust on the dealer's next hit card, (3) bets on whether the dealer will bust at any point in the hand, (4) bets on whether the player will win the hand, (5) bets on whether the player's next hit card will be better than the dealer's next hit card, without busting, (6) bets on whether the player will obtain a particular total (e.g., 21) and/or (7) bets on whether the dealer will obtain a particular total (e.g., 18). Example rules 72 for each of these types 44 of calculated odds bets 32 are discussed as follows.

Calculated Odds Bet 32*a* on Whether the Dealer Will Bust on the Dealer's First Hit Card.

In certain embodiments, betting system platform 12 may offer players 18 a calculated odds bet 32*a* on whether the dealer will bust on the dealer's first hit card. This bet 32*a* may be offered to the player 18 at various times, such as (1) before the blackjack hand is dealt or (2) after the original two cards are dealt to each of the dealer's hand 50 and the player's hand 52. If the bet 32*a* is offered to the player 18 before the blackjack hand is dealt, the event odds 46 for the bet 32*a* may comprise the overall odds that the dealer will bust on his first hit card in a blackjack hand, regardless of the original hand (i.e., the first two cards) that the dealer will be dealt. The event odds 46 may be determined based on the assumption that player 18 will play the hand according to the optimal player strategies 73 for each situation faced by player 18. As discussed above, such optimal player strategies 73 may, for example, optimize the player's odds of winning the hand or winning the calculated odds bet 32*a*. In addition, in certain embodiments, the event odds 46 may be determined based on the assumption that player 18 will not bust and/or that the dealer will have to take at least one hit card. As discussed above, the offered odds 48 at which the bet 32*a* is offered to player 18 may be determined based on the determined event odds 46, such as to provide the house a statistical advantage, for example.

Alternatively, if the bet 32*a* is offered to the player 18 after the original two cards are dealt to each of the dealer's hand 50 and the player's hand 52, betting system platform 12 may determine the event odds 46 based on the dealer's face-up card, but not the dealer's face-down card. In some embodiments, betting system platform 12 may determine the event odds 46 based on the dealer's face-up card, but not based on the dealer's face-down card or the cards in the player's hand 52. For example, if the dealer's face-up card is a "4," event odds 46 that the dealer will bust on its first hit card may be determined based on the "4" card but without regard to the dealer's face-down card or the cards in the player's hand 52. As discussed above, the event odds 46 may be determined based on the assumption that player 18 will play the hand according to the optimal player strategies 73 for each situation faced by player 18.

In other embodiments, betting system platform 12 may determine the event odds 46 based on both the dealer's face-up card (but not based on the dealer's face-down card) and the cards in the player's hand 52. Again, the event odds 46 may be determined based on the assumption that player 18 will play the hand according to the relevant optimal player strategies 73. For example, if the dealer's face-up card is a "5" and the player's hand 52 includes a "King" and a "3," for a total of 13, event odds 46 that the dealer will bust on its first hit card may be determined based on the dealer's "5" card and the player's total of 13, assuming that the player 18 will play the hand according to the optimal player strategies 73. Here, if the optimal player strategies 73 define the optimal strategies for player 18 to win the hand, the optimal player strategy 73 for player 18 will be to "stand" (i.e., not hit) since a player having a total of 13 against a dealer's face-up card of 5 maximizes his chances of winning the hand by standing. Thus, in calculating event odds 46 that the dealer will bust, betting system platform 12 may assume that player 18 will stand. In addition, as discussed above, in certain embodiments the event odds 46 may generally be determined based on the assumption that player 18 will not bust and/or that the dealer will have to take at least one hit card.

Calculated Odds Bet 32*b* on Whether the Dealer Will Bust on the Dealer's Next Hit Card.

In certain embodiments, betting system platform 12 may also offer players 18 a calculated odds bet 32*b* on whether the dealer will bust on the dealer's next hit card. Thus, as opposed to the calculated odds bet 32*a* discussed above regarding the dealer's first hit card, calculated odds bet 32*b* may be offered not only (1) before the blackjack hand is dealt or (2) after the original two cards are dealt to each of the dealer's hand 50 and player's hand 52, but also (3) after one or more hit cards have been dealt to the dealer's hand 50.

For example, betting system platform 12 may offer player 18 calculated odds bet 32*b* before a particular hand is dealt. The event odds 46 for the bet 32*b* offered at this point comprise the overall odds that the dealer will bust on his first hit card in a blackjack hand, regardless of the original hand (i.e., the first two cards) that the dealer will be dealt, as discussed above regarding bet 32*a*. The bet 32*b* may be offered to player 18 at offered odds 48, which may be determined based on the determined event odds 46 for bet 32*b*, such as to provide the house a statistical advantage, for example.

After dealing the two original cards (a face-up card and a face-down card) to the dealer's hand 50 and the two original cards to the player's hand 52, betting system platform 12 may again offer calculated odds bet 32*b* to player 18. At this point, the event odds 46 may be determined based on (a) the dealer's face-up card, but neither the dealer's face-down card nor the cards in the player's hand 52 or (b) the dealer's face-up card and the cards in the player's hand 52, but not the dealer's face-down card, such as discussed above regarding calculated odds bet 32*a*. The event odds 46 determined for the bet 32*b* offered at this point may be different from the event odds 46 determined for the bet 32*b* offered before the original dealer's hand 50 and player's hand 52 were dealt. As discussed above, this new bet 32*b* may then be offered to player 18 at offered odds 48 determined based on the determined event odds 46, such as to provide the house a statistical advantage, for example.

Supposing that the dealer does take a hit card and will be taking another hit card (such as when the total of the dealer's hand 50 is less than 17 after the first hit card, for example), betting system platform 12 may once again offer calculated odds bet 32*b* to player 18. The event odds 46 for this bet 32*b* may be determined based on (a) the dealer's face-up card and hit card, but neither the dealer's face-down card nor the cards in the player's hand 52 or (b) the dealer's face-up card, the dealer's hit card and the cards in the player's hand 52, but not the dealer's face-down card. The event odds 46 determined for the bet 32*b* offered at this point may be different from the event odds 46 determined for the bet 32*b* offered before the original dealer's hand 50 and player's hand 52 were dealt and/or the event odds 46 determined after the original dealer's hand 50 and player's hand 52 were dealt but before any hit cards were dealt to the dealer's hand 50. As discussed above, this new bet 32*b* may then be offered to player 18 at offered odds 48 determined based on the determined event odds 46, such as to provide the house a statistical advantage, for example.

In the same manner, betting system platform 12 may continue to offer calculated odds bets 32*b* to player 18 after each hit card dealt to the dealer's hand 50 where the dealer will be taking yet another hit card. In some embodiments, betting system platform 12 may offer multiple calculated odds bets 32 to player 18 within a single blackjack hand as discussed above, and player 18 may place one or more of these offered bets 32 on the same hand.

Calculated Odds Bet 32*c* on Whether the Dealer Will Bust at any Point in the Hand.

In certain embodiments, betting system platform 12 may also offer players 18 a calculated odds bet 32*c* on whether the dealer will bust at any point during the hand. Thus, as opposed to the calculated odds bets 32*a* and 32*b* discussed above, which each regard the chance of the dealer busting on a particular hit card (either the first hit card or the next hit card), calculated odds bet 32*c* concerns whether the dealer will bust at any point in the hand. Betting system platform 12 may offer player 18 calculated odds bet 32*c* at any time during the hand, such as (1) before the blackjack hand is dealt, (2) after the original two cards are dealt to each of the dealer's hand 50 and the player's hand 52, or (3) after one or more hit cards have been dealt to the dealer's hand 50.

As discussed above, the event odds 46—and thus the offered odds 48—for each calculated odds bet 32*c* offered to player 18 may depend on the point in the hand at which the bet 32*c* is offered. For example, if calculated odds bet 32*c* is offered before a particular hand is dealt, the event odds 46 may comprise the overall odds that the dealer will bust at any point during the hand, regardless of the original hand (i.e., the first two cards) that the dealer will be dealt. If calculated odds bet 32*c* is offered to the player 18 after the original two cards are dealt to each of the dealer's hand 50 and the player's hand 52, the event odds 46 for bet 32*c* may be determined based on (a) the dealer's face-up card, but neither the dealer's face-down card nor the cards in the player's hand 52 or (b) the dealer's face-up card and the cards in the player's hand 52, but not the dealer's face-down card. If calculated odds bet 32*c* is offered to the player 18 after one or more hit cards have been dealt to the dealer (and where the dealer will be taking another hit card), the event odds 46 for bet 32*c* may be determined based on (a) the dealer's face-up card and hit card, but neither the dealer's face-down card nor the cards in the player's hand 52 or (b) the dealer's face-up card, the dealer's hit card and the cards in the player's hand 52, but not the dealer's face-down card.

Again, the event odds 46 for any of such bets 32*c* may be determined based on the assumption that player 18 will play the hand according to the optimal player strategies 73 for each situation faced by player 18. As discussed above, such optimal player strategies 73 may, for example, optimize the player's odds of winning the hand or winning the calculated odds bet 32*c*. In addition, as discussed above, in certain embodiments the event odds 46 for bets 32*c* may be determined based on the assumption that player 18 will not bust and/or that the dealer will have to take at least one hit card.

Calculated Odds Bet 32*d* on Whether the Player Will Win the Hand.

In certain embodiments, betting system platform 12 may also offer a player 18 a calculated odds bet 32*d* on whether the player 18 will win the hand. Betting system platform 12 may offer player 18 calculated odds bet 32*c* at various times during the hand, such as (1) before the blackjack hand is dealt, (2) after the original two cards are dealt to each of the dealer's hand 50 and player's hand 52, (3) after the player 18 has made one or more playing decisions (such as hitting, standing, splitting or doubling down, for example), or (4) after one or more hit cards have been dealt to the dealer's hand 50.

As discussed above regarding calculated odds bet 32*a*, 32*b* and 32*c*, the event odds 46—and thus the offered odds 48—for each calculated odds bet 32*d* offered to player 18 may depend on the point in the hand at which the bet 32*d* is offered. For example, in certain embodiments, the event odds 46 for each calculated odds bet 32*d* offered to player 18 may be determined based on (1) the cards currently in the dealer's hand 50, except for the dealer's face down card, and/or (2) the cards currently in the player's hand 52 at the time the bet 32*d* is offered. The event odds 46 for each calculated odds bet 32*d* may be determined based on the assumption that player 18 will play the hand according to the optimal player strategies 73 for each situation faced by player 18, where such optimal player strategies 73 define the playing decisions that would optimize the player's odds of winning the hand or maximizing his profits on the hand.

Calculated Odds Bet 32*e* on Whether the Player's Next Hit Card Will be Better than the Dealer's Next Hit Card, without Busting.

In certain embodiments, betting system platform 12 may also offer a player 18 a calculated odds bet 32*e* on whether the next hit card for the player 18 will be better than the next hit card for the dealer—in other words, whether the next hit card for the player 18 will improve the player's hand 52 (without busting) more than the next hit card for the dealer will improve the dealer's hand 50 (without busting). In some situations, the next hit card for each of the dealer and player 18 may be the first hit card for each of the dealer and player 18.

For example, suppose the original dealer's hand includes a "5" card face-up along with the face-down card, and the original player's hand 52 includes a "Jack" and a "5" card, for a total of 15. Betting system platform 12 may also offer player 18 a calculated odds bet 32*e* that the first hit card for the player 18 will increase the total of the player's hand 52 (without player's hand 52 going over 21) by a greater amount than the first hit card for the dealer will increase the total of the dealer's hand 50 (without dealer's hand 50 going over 21). Thus, for example, supposing the dealer's down-card was a 7, for a total hand of 12, the results of the bet 32*e* for various hit cards for the dealer and player 18 are illustrated below in Table 1.

TABLE 1

Results of bet 32e for various dealer and player hit cards.

| Dealer's original hand | Dealer's first hit card | Dealer's new total | Player's original hand | Player's first hit card | Player's new total | Result of bet |
|---|---|---|---|---|---|---|
| 12 | 10/ face | 22 (bust) | 15 | 4 | 19 | Player wins |
| 12 | 8 | 20 | 15 | 6 | 21 | Dealer wins |
| 12 | 2 | 14 | 15 | 4 | 19 | Player wins |
| 12 | n/a | n/a | 15 | 10/ face | 25 (bust) | Dealer wins |
| 12 | 5 | 17 | 15 | 5 | 20 | Push |

Betting system platform 12 may offer player 18 such a calculated odds bet 32*e* at various times during the hand, such as (1) before the blackjack hand is dealt, and (2) after the original two cards are dealt to each of the dealer's hand 50 and player's hand 52, for example. As discussed above regarding calculated odds bet 32*a*-32*d*, the event odds 46—and thus the offered odds 48—for each calculated odds bet 32*e* offered to player 18 may depend on the point in the hand at which the bet 32*e* is offered. For example, in certain embodiments, the event odds 46 for each calculated odds bet 32*e* offered to player 18 may be determined based on (1) the cards currently in the dealer's hand 50, except for the dealer's face down card, and (2) the cards currently in the player's hand 52 at the time the bet 32*e* is offered. In certain embodiments, a calculated odds bet 32*e* placed by player 18 is automatically cancelled in particular situations, such as if the original dealer's hand 50 does not require the dealer to take a hit card (such as if the original dealer's hand 50 is 17 or greater), for example.

Calculated Odds Bet 32*f* on Whether the Player Will Obtain a Particular Total In certain embodiments, betting system platform 12 may also offer a player 18 a calculated odds bet 32*f* on whether the player will obtain a particular total for the player's hand. For example, a player 18 may place a bet on whether the player 18 will obtain a hand totaling 21. Calculated odds bet 32*f* may be offered (1) before the blackjack hand is dealt, (2) after the original two cards are dealt to each of the dealer's hand 50 and player's hand 52 and/or (3) after one or more hit cards have been dealt to the dealer's hand 50. In some embodiments, player 18 may select the particular total that the player 18 must obtain to win the calculated odds bet 32*f*. For example, player 18 may select the particular total of 20 such that player 18 wins the calculated odds bet 32*f* if the player reaches a total of 20 for his hand. In other embodiments, calculated odds bet 32*f* based on one or more particular totals for the player's hand may be offered to player 18. For example, in a particular embodiment, betting system platform 12 offers player 18 a calculated odds bet 32*f* on whether player 18 will achieve a hand totaling 21.

As discussed above regarding calculated odds bet 32*a*-32*e*, the event odds 46—and thus the offered odds 48—for each calculated odds bet 32*f* offered to player 18 may depend on the point in the hand at which the bet 32*f* is offered. For example, in certain embodiments, the event odds 46 for each calculated odds bet 32*f* offered to player 18 may be determined based on (1) the cards currently in the player's hand 52 at the time the bet 32*d* is offered (if any) and/or (2) the cards currently in the dealer's hand 50 (if any), except for the dealer's face down card. In some embodiments, the event odds 46 for each calculated odds bet 32*f* may be determined based on the assumption that player 18 will play the hand according to the optimal player strategies 73 for each situation faced by player 18, where such optimal player strategies 73 define the playing decisions that would optimize the player's odds of winning the hand or maximizing his profits on the hand.

Calculated Odds Bet 32*g* on Whether the Player Will Obtain a Particular Total In certain embodiments, betting system platform 12 may also offer a player 18 a calculated odds bet 32*g* on whether the player will obtain a particular total for the dealer's hand. For example, a player 18 may place a bet on whether the dealer will obtain a hand totaling 19. Calculated odds bet 32*g* may be offered (1) before the blackjack hand is dealt, (2) after the original two cards are dealt to each of the dealer's hand 50 and player's hand 52 and/or (3) after one or more hit cards have been dealt to the dealer's hand 50. In some embodiments, player 18 may select the particular total for the dealer's hand to win the calculated odds bet 32*g*. For example, player 18 may select the particular total of 20 such that player 18 wins the calculated odds bet 32*g* if the dealer obtains a total of 20 for the dealer's hand. In other embodiments, calculated odds bet 32*g* based on one or more particular totals for the dealer's hand may be offered to player 18. For example, in a particular embodiment, betting system platform 12 offers player 18 a calculated odds bet 32*g* on whether the dealer will achieve a hand totaling 21.

As discussed above regarding calculated odds bet 32*a*-32*f*, the event odds 46—and thus the offered odds 48—for each calculated odds bet 32*g* offered to player 18 may depend on the point in the hand at which the bet 32*g* is offered. For example, in certain embodiments, the event odds 46 for each calculated odds bet 32*g* offered to player 18 may be determined based on (1) the cards currently in the dealer's hand 50 (if any), except for the dealer's face down card and/or (2) the cards currently in the player's hand 52 at the time the bet 32*d* is offered (if any). In some embodiments, the event odds 46 for each calculated odds bet 32*g* may be determined based on the assumption that player 18 will play the hand according to the optimal player strategies 73 for each situation faced by player 18, where such optimal player strategies 73 define the playing decisions that would optimize the player's odds of winning the hand or maximizing his profits on the hand.

Detailed Example of the Operation of System 10

Figure 2:
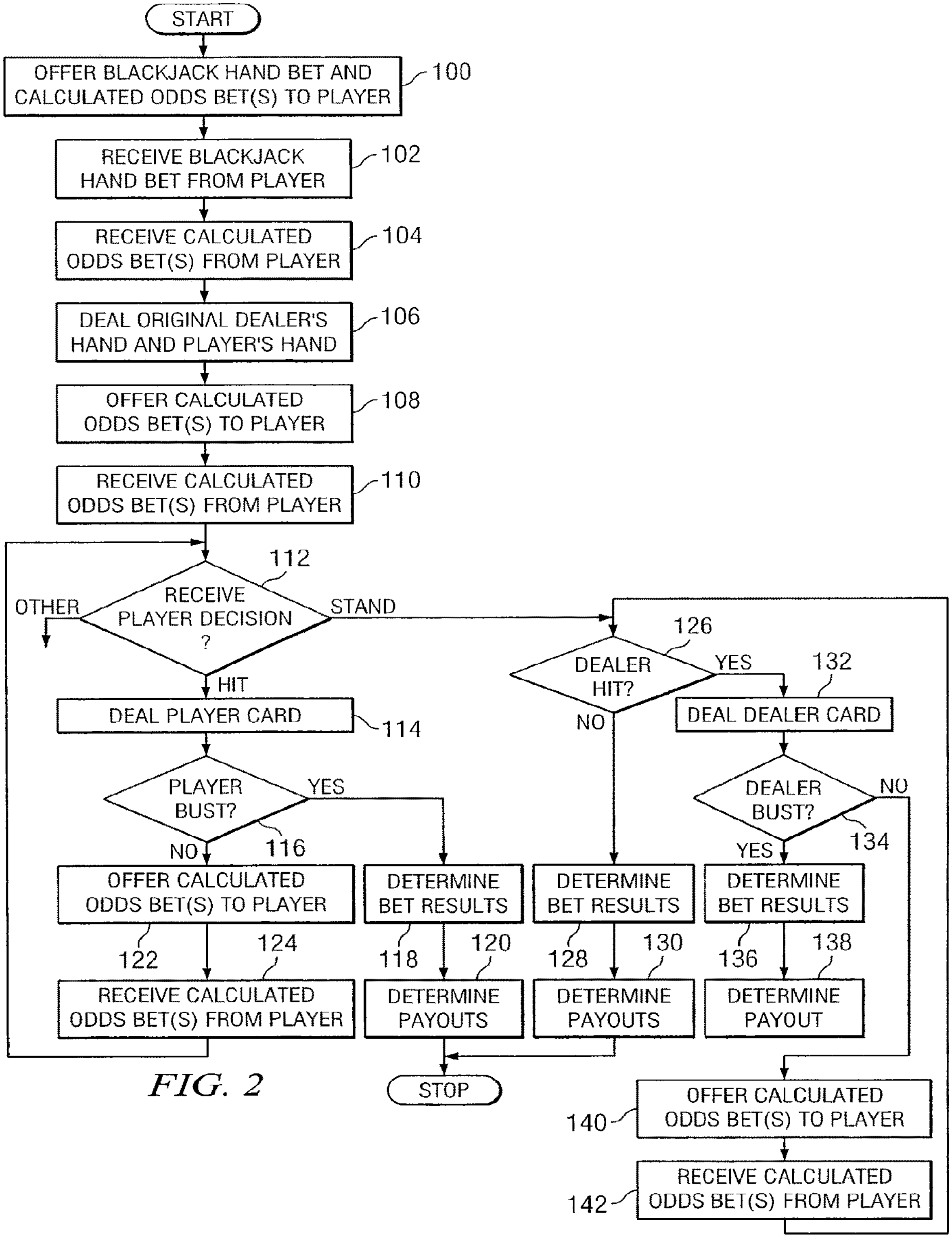
FIG. 2 illustrates an example method of managing a blackjack game in which various calculated odds bets are offered to a player in accordance with a particular embodiment of the invention.

FIG. 2 illustrates an example method of managing a blackjack game in which various calculated odds bets are offered to a player 18 in accordance with a particular embodiment of the invention. At step 100, during an online gaming session between a player 18 and betting system platform 12, betting system platform 12 offers a blackjack hand bet 30 and one or more types 44 of calculated odds bets 32 to player 18, as illustrated by arrows 150 and 152 in FIG. 1. For example, betting system platform 12 may offer player 18 (1) a calculated odds bets 32*a* on whether the dealer will bust on the dealer's first hit card, (2) a calculated odds bets 32*c* on whether the dealer will bust at any point in the hand, (3) a calculated odds bets 32*d* on whether player 18 will win the hand, (4) a calculated odds bets 32*f* on whether the player will obtain a particular total selected by player 18 and/or (5) a calculated odds bets 32*g* on whether the dealer will obtain a particular total selected by player 18. (Betting system platform 12 may wait until later in the hand to offer player 18 other types of calculated odds bets 32, such as (1) a calculated odds bets 32*b* on whether the dealer will bust on the dealer's next hit card, and (2) a calculated odds bets 32*e* on whether the player's next hit card will be better than the dealer's hit card, without busting.) Betting system platform 12 may determine event odds 46 and offered odds 48 for each of such bets 32*a*, 32*c*, 32*d*, 32*f* and 32*g* in any suitable manner, such as described above. Betting system platform 12 may communicate the determined offered odds 48 for each type of calculated odds bet 32*a*, 32*c*, 32*d*, 32*f* and 32*g* offered to player 18 such that player 18 may view the offered odds 48 and determine whether to place such bets. All communications between player 18 and betting system platform 12 described in the present method may be made via communication network 16 using one or more web pages 94 provided by web server 90 associated with betting system platform 12, as illustrated by arrow 154 in FIG. 1.

At step 102, player 18 places the blackjack hand bet 30 with betting system platform 12, as illustrated by arrow 156 in FIG. 1. Player 18 may select one or more blackjack hand bet parameters 34 for the bet 30, such as the unit stake 36 of the bet 30 (i.e., the amount wagered by player 18), for example. At step 104, player 18 may place zero, one, or more of the offered calculated odds bets 32*a*, 32*c*, 32*d*, 32*f* and/or 32*g* with betting system platform 12, as illustrated by arrow 158 in FIG. 1. For each calculated odds bet 32 placed by player 18, player 18 may select one or more calculated odds bet parameters 40 for the bet 30, such as the bet type 44 and unit stake 42 of that calculated odds bet 32 (i.e., the amount wagered by player 18), for example.

At step 106, betting system platform 12 determines, or "deals," a pair of cards for each of the dealer's hand 50 and the player's hand 52. As discussed above, for the dealer's hand 50, betting system platform 12 may deal one card face-up and one card face-down. At step 108, betting system platform 12 may again offer one or more types 44 of calculated odds bets 32 to player 18. For example, betting system platform 12 may offer one or more calculated odds bets 32*a*, 32*c*, 32*d*, 32*e*, 32*f* and/or 32*g* to player 18. As discussed above, at this point, betting system platform 12 may determine the event odds 46—and thus the offered odds 48—for each calculated odds bet 32 offered to player 18 based on (1) the dealer's face-up card and/or (2) the pair of cards in the player's hand 52. Thus, the event odds 46 and offered odds 48 for each type 44 of calculated odds bet 32 offered at step 108 may be different than the event odds 46 and offered odds 48 for the same types 44 of calculated odds bet 32 offered at step 100. At step 110, player 18 may place zero, one, or more of the calculated odds bets 32*a*, 32*c*, 32*d*, 32*e*, 32*f* and/or 32*g* offered at step 108. In some embodiments, player 18 may place such calculated odds bet 32 in addition to one or more calculated odds bets 32 placed by player 18 at step 104. For each calculated odds bet 32 placed by player 18, player 18 may select one or more calculated odds bet parameters 40 for the bet 30, such as the bet type 44 and unit stake 42 of that calculated odds bet 32.

At step 112, player 18 may make a playing decision for the blackjack hand, presumably based on the cards visible to player 18 (i.e., the dealer's face-up card and the player's pair of cards). For example, player 18 may decide to hit, stand, or take some other action, such as splitting a pair, doubling down, taking insurance, or taking even money, for example. Player 18 then communicates his decision to betting system platform 12 via one or more web pages 94, such as by clicking on a "hit" button or a "stand" button, for example.

If player 18 decides to "hit," betting system platform 12 deals a hit card to the player's hand 52 at step 114. Betting system platform 12 then determines the total value of the cards in the player's hand 52 and determines at step 116 whether player 18 has busted (i.e., gone over 21). If player 18 has busted, at step 118 betting system platform 12 determines the bet results 78 for each bet 20 placed by player 18, including the blackjack hand bet 30 and each calculated odds bet 32 placed by player 18 before or during the hand. At step 120, betting system platform 12 then determines a payout 80 for each of such bets 20 placed by player 18. The payout 80 for certain calculated odds bet 32 placed by player 18 may be zero, while the payout 80 for other calculated odds bet 32 placed by player 18 may be determined based on the offered odds 48 associated with such bets 32.

Alternatively, if it is determined at step 116 that player 18 has not busted, betting system platform 12 may once again offer one or more types 44 of calculated odds bets 32 to player 18 at step 122. For example, at this point, betting system platform 12 may offer player 18 calculated odds bet 32*a*, 32*c*, 32*d*, 32*e*, 32*f* and/or 32*g*. Betting system platform 12 may determine the event odds 46—and thus the offered odds 48—for each calculated odds bet 32 offered to player 18 based on (1) the dealer's face-up card and/or (2) all of the cards currently in the player's hand 52. Thus, the event odds 46 and offered odds 48 for each type 44 of calculated odds bet 32 offered at step 108 may be different than the event odds 46 and offered odds 48 for the same types 44 of calculated odds bets 32 offered at step 100 and/or step 108. At step 124, player 18 may place zero, one, or both of the calculated odds bets 32 offered at step 122. In some embodiments, player 18 may place such calculated odds bet 32 in addition to one or more calculated odds bets 32 placed by player 18 at step 104 and/or step 110.

At this point, the method may return to step 112 for player 18 to make another playing decision, presumably based on the cards now visible to player 18 (i.e., the dealer's face-up card and the player's original pair of cards and hit card). Player 18 may continue to "hit" as many times as he wishes until either player 18 busts or decides to stand. Each time player 18 decides to "hit," steps 114 through 124 may be repeated. Thus, particular calculated odds bets 32 (such as calculated odds bets 32*a*, 32*c*, 32*d*, 32*e*, 32*f* and/or 32*g*, for example) may be offered to player 18 after each hit card dealt to the player's hand 52.

Once player 18 decides to "stand" at step 112, betting system platform 12 determines at step 126 whether to deal a hit card to the dealer's hand 50 based on the pair of cards in the dealer's hand 50 (the face-up card and the face-down card) and the cards in the player's hand 52. In some embodiments, a hit card will generally be dealt to the dealer's hand 50 if the total of the dealer's hand 50 is both (a) less than or equal to the total of the cards in the player's hand 52 and (b) less than 17. If it is determined that no hit card is to be dealt to dealer's hand 50, the hand is complete and the method may continue to step 128 such that betting system platform 12 may determine the bet results 78 for each bet 20 placed by player 18, including the blackjack hand bet 30 and each calculated odds bet 32 placed by player 18 before or during the hand. At step 130, betting system platform 12 then determines a payout 80 for each of such bets 20 placed by player 18. The payout 80 for certain calculated odds bet 32 placed by player 18 (e.g., losing bets 32) may be zero, while the payout 80 for other calculated odds bet 32 placed by player 18 (e.g., winning bets 32) may be determined based on the offered odds 48 associated with such bets 32.

Alternatively, betting system platform 12 may select (or deal) a hit card for the dealer's hand 50 at step 132. Betting system platform 12 may then determine whether the dealer has busted (i.e., gone over 21). If the dealer has busted, at step 136 betting system platform 12 determines the bet results 78 for each bet 20 placed by player 18, including the blackjack hand bet 30 and each calculated odds bet 32 placed by player 18 before or during the hand. At step 120, betting system platform 12 then determines a payout 80 for each of such bets 20 placed by player 18. As discussed above, the payout 80 for certain calculated odds bet 32 placed by player 18 (e.g., losing bets 32) may be zero, while the payout 80 for other calculated odds bet 32 placed by player 18 (e.g., winning bets 32) may be determined based on the offered odds 48 associated with such bets 32.

Alternatively, if it is determined at step 134 that the dealer has not busted, betting system platform 12 may once again offer one or more types 44 of calculated odds bets 32 to player 18 at step 140. For example, at this point, betting system platform 12 may offer player 18 calculated odds bet 32*b*, 32*c*, 32*d* and/or 32*g*. Betting system platform 12 may determine the event odds 46—and thus the offered odds 48—for each calculated odds bet 32 offered to player 18 based on (1) the total of the dealer's face-up card and hit card and/or (2) all of the cards currently in the player's hand 52. Thus, the event odds 46 and offered odds 48 for each type 44 of calculated odds bet 32 offered at step 108 may be different than the event odds 46 and offered odds 48 for the same types 44 of calculated odds bets 32 offered at step 100, step 108 and/or step 122. At step 142, player 18 may place zero, one, or both of the calculated odds bets 32 offered at step 140. In some embodiments, player 18 may place such calculated odds bet 32 in addition to one or more calculated odds bets 32 placed by player 18 at step 104, step 110 and/or step 124.

At this point, the method may return to step 126 for betting system platform 126 to determine whether to deal another hit card to dealer's hand 50. Steps 132 through 142 may be repeated until the dealer busts or no more hit cards are dealt to the dealer's hand 50. Thus, each time a hit card is dealt to dealer's hand 50, particular calculated odds bets 32 (such as calculated odds bets 32*b*, 32*c*, 32*d* and/or 32*g*, for example) may be offered to player 18 at step 140.

It should be understood that in alternative embodiments, the present invention contemplates using methods with additional steps, fewer steps, different steps, or steps in different sequential order so long as the steps remain appropriate for providing and managing casino game betting based on pari-mutuel racing.

Although embodiments of the invention and their advantages are described in detail, a person skilled in the art could make various alterations, additions, and omissions without departing from the spirit and scope of the present invention as defined by the appended claims.

What is claimed is:

1. A method comprising:

providing, by a computing platform, for a terminal of a player, data representing a plurality of playing cards for a hand in an electronic card game over a communication network;

determining, by the computing platform, odds of an occurrence of at least one subsequent event in the electronic card game, wherein the determined odds are determined based at least in part on at least one of the plurality of playing cards;

generating electronic commands for displaying data conveying offered odds for the occurrence of the at least one subsequent event as part of the electronic card game on the terminal, wherein the offered odds are based at least in part on the determined odds;

generating electronic commends for visually rendering at least one graphical object on the terminal, wherein the at least one graphical object is configured to receive input from the player indicating a bet for an amount of money for the occurrence of the at least one subsequent event at the offered odds; and wherein the electronic card game is poker and wherein the determined odds are determined in real time.

2. The method of claim 1, wherein the amount of money is predetermined.

3. The method of claim 1, wherein the amount of money is player selectable.

4. The method of claim 1, wherein the at least one subsequent event includes a first subsequent event and a second subsequent event, wherein the determined odds include first determined odds for the occurrence of the first subsequent event, and second determined odds for the occurrence of the second subsequent event, and wherein the offered odds include a first offered odds based on the first determined odds, and a second offered odds based on the second determined odds.

5. The method of claim 1, wherein the offered odds are offset from the determined odds by a predetermined amount.

6. An apparatus comprising:

at least one processor; and a memory device communicatively coupled with the at least one processor having a plurality of instructions stored therein, wherein execution of the plurality of instructions by the at least one processor causes the at least one processor to perform a plurality of operations, the plurality of operations comprising:

providing, for a terminal of a player, data representing a plurality of playing cards for a hand in an electronic card game over a communication network;

determining, odds of an occurrence of at least one subsequent event in the electronic card game, wherein the determined odds are determined based at least in part on at least one of the plurality of playing cards;

generating electronic commands for displaying data conveying offered odds for the occurrence of the at least one subsequent event as part of the electronic card game on the terminal, wherein the offered odds are based at least in part on the determined odds;

generating electronic commends for visually rendering at least one graphical object on the terminal, wherein the at least one graphical object is configured to receive input from the player indicating a bet for an amount of money for the occurrence of the at least one subsequent event at the offered odds; and wherein the electronic card game is poker and wherein the determined odds are determined in real time.

7. The apparatus of claim 6, wherein the amount of money is predetermined.

8. The apparatus of claim 6, wherein the amount of money is player selectable.

9. The apparatus of claim 6, wherein the at least one subsequent event includes a first subsequent event and a second subsequent event, wherein the determined odds include first determined odds for the occurrence of the first subsequent event, and second determined odds for the occurrence of the second subsequent event, and wherein the offered odds include a first offered odds based on the first determined odds, and a second offered odds based on the second determined odds.

10. The apparatus of claim 6, wherein the offered odds are offset from the determined odds by a predetermined amount.

11. A video poker terminal comprising:

at least one processor; and a memory device communicatively coupled with the at least one processor having a plurality of instructions stored therein, wherein execution of the plurality instructions by the at least one processor causes the at least one processor to perform a plurality of operations, the plurality of operations comprising:

providing data representing a plurality of playing cards for a hand in an electronic card game to a display;

determining, odds of an occurrence of at least one subsequent event in the electronic card game, wherein the determined odds are determined based at least in part on at least one of the plurality of playing cards;

providing data conveying offered odds for the occurrence of the at least one subsequent event as part of the electronic card game to the display, wherein the offered odds are based at least in part on the determined odds;

providing at least one graphical object to the display, wherein the at least one graphical object is configured to receive input from a player indicating a bet for an amount of money for the occurrence of the at least one subsequent event at the offered odds; and wherein the electronic card game is poker and wherein the odds are determined in real time.

12. The video poker terminal of claim 11, wherein the amount of money is predetermined.

13. The video poker terminal of claim 11, wherein the amount of money is player selectable.

14. The video poker terminal of claim 11, wherein the at least one subsequent event includes a first subsequent event and a second subsequent event, wherein the determined odds include first determined odds for the occurrence of the first subsequent event, and second determined odds for the occurrence of the second subsequent event, and wherein the offered odds include a first offered odds based on the first determined odds, and a second offered odds based on the second determined odds.

15. The video poker terminal of claim 11, wherein the offered odds are offset from the determined odds by a predetermined amount.

* * * * *